US012690055B2

(12) United States Patent
Jiang

(10) Patent No.: US 12,690,055 B2
(45) Date of Patent: Jul. 21, 2026

(54) METHOD AND DEVICE FOR CONFIGURING RECEIVE WINDOW OF PDCP ENTITY

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 368 days.

(21) Appl. No.: 18/552,569

(22) PCT Filed: Mar. 31, 2021

(86) PCT No.: PCT/CN2021/084700
§ 371 (c)(1),
(2) Date: Sep. 26, 2023

(87) PCT Pub. No.: WO2022/205191
PCT Pub. Date: Oct. 6, 2022

(65) Prior Publication Data
US 2024/0179729 A1 May 30, 2024

(51) Int. Cl.
*H04W 28/02* (2009.01)
*H04W 72/30* (2023.01)
(52) U.S. Cl.
CPC .................................. *H04W 72/30* (2023.01)
(58) Field of Classification Search
CPC ..... H04W 76/19; H04W 76/40; H04W 36/08; H04W 76/15; H04W 76/27; H04W 36/362; H04W 40/36; H04W 24/10; H04W 36/18; H04L 5/001
See application file for complete search history.

(56) References Cited

U.S. PATENT DOCUMENTS

| | | | |
|---|---|---|---|
| 2007/0258591 A1 | 11/2007 | Terry et al. | |
| 2014/0105096 A1 | 4/2014 | Wang et al. | |
| 2023/0362886 A1* | 11/2023 | Li | H04W 4/08 |

FOREIGN PATENT DOCUMENTS

EP 3065500 A1 9/2016

OTHER PUBLICATIONS

International Search Report and Written Opinion of International Application No. PCT/CN2021/084700, dated Dec. 29, 2021, 18 pages.
Qualcomm Inc, FirstNet, UIC, BT Plc, Kyocera, BBC, AT&T, "NR Multicast PTM bearer RLC AM mode operation", 3GPP TSG-RAN WG2 Meeting #113-e, R2-2100319, E-Meeting: Jan. 25-Feb. 5, 2021, 9 pages.
Extended European Search Report issued in Application No. 21933855.5 dated Mar. 25, 2024, 8 pages.

* cited by examiner

*Primary Examiner* — Phuoc H Doan
(74) *Attorney, Agent, or Firm* — Finnegan, Henderson, Farabow, Garrett & Dunner, L.L.P.

(57) ABSTRACT

A method for configuring a receiving window of a packet data convergence protocol (PDCP) entity is executed by a terminal device, and includes: determining an adjustment parameter corresponding to a variable of the receiving window of the PDCP entity; and configuring the variable of the receiving window of the PDCP entity based on the adjustment parameter.

19 Claims, 6 Drawing Sheets

S401 determining an adjustment parameter corresponding to a variable of the receiving window of the PDCP entity

S402 in response to the adjustment parameter including a window length and/or a boundary value of the receiving window, configuring the variable of the receiving window according to the window length and/or the boundary value

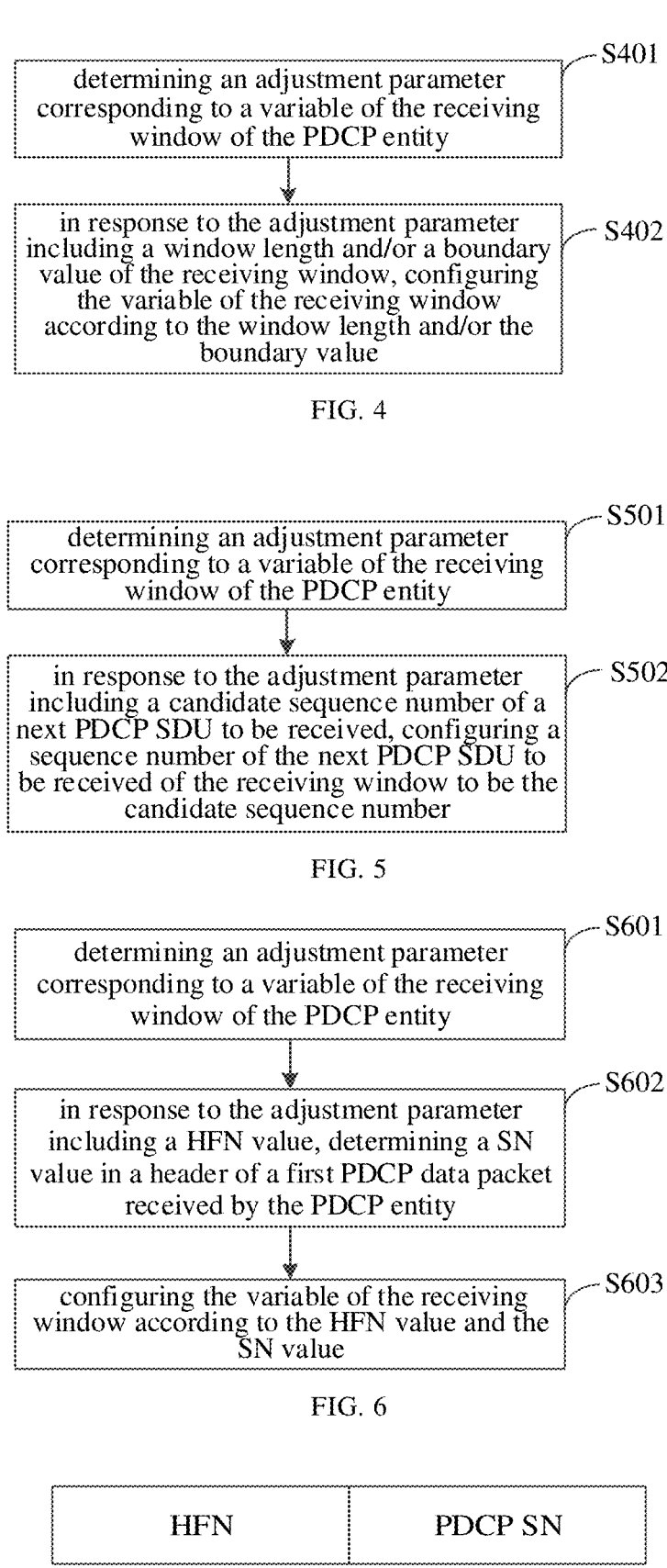

determining an adjustment parameter
corresponding to a variable of the receiving
window of the PDCP entity
— S401 in response to the adjustment parameter
including a window length and/or a boundary
value of the receiving window, configuring
the variable of the receiving window
according to the window length and/or the
boundary value
— S402

FIG. 4 determining an adjustment parameter
corresponding to a variable of the receiving
window of the PDCP entity
— S501 in response to the adjustment parameter
including a candidate sequence number of a
next PDCP SDU to be received, configuring a
sequence number of the next PDCP SDU to
be received of the receiving window to be the
candidate sequence number
— S502

FIG. 5 determining an adjustment parameter
corresponding to a variable of the receiving
window of the PDCP entity
— S601 in response to the adjustment parameter
including a HFN value, determining a SN
value in a header of a first PDCP data packet
received by the PDCP entity
— S602 configuring the variable of the receiving
window according to the HFN value and the
SN value
— S603

FIG. 6

| HFN | PDCP SN |
|---|---|

FIG. 7

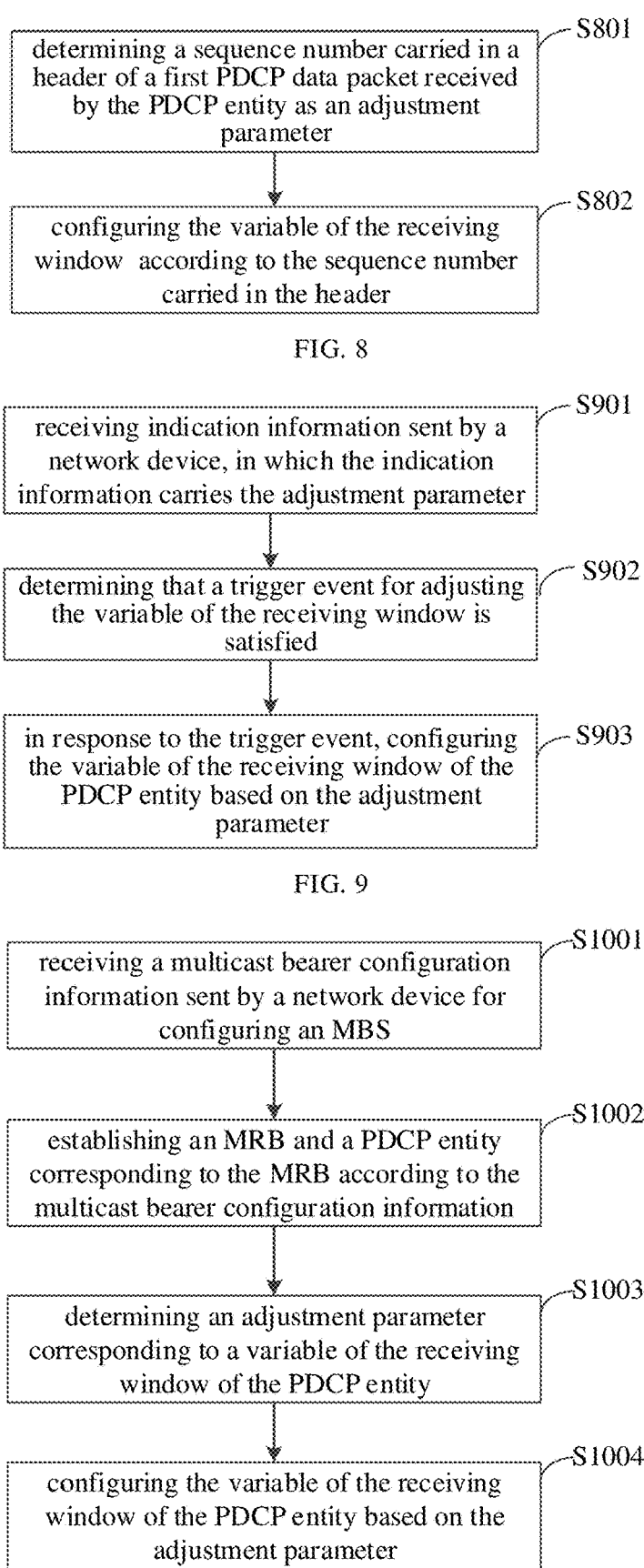

determining a sequence number carried in a header of a first PDCP data packet received by the PDCP entity as an adjustment parameter ⌐ S801 configuring the variable of the receiving window according to the sequence number carried in the header ⌐ S802

FIG. 8 receiving indication information sent by a network device, in which the indication information carries the adjustment parameter ⌐ S901 determining that a trigger event for adjusting the variable of the receiving window is satisfied ⌐ S902 in response to the trigger event, configuring the variable of the receiving window of the PDCP entity based on the adjustment parameter ⌐ S903

FIG. 9 receiving a multicast bearer configuration information sent by a network device for configuring an MBS ⌐ S1001 establishing an MRB and a PDCP entity corresponding to the MRB according to the multicast bearer configuration information ⌐ S1002 determining an adjustment parameter corresponding to a variable of the receiving window of the PDCP entity ⌐ S1003 configuring the variable of the receiving window of the PDCP entity based on the adjustment parameter ⌐ S1004

FIG. 10 normal MBS bearer          separated MBS bearer

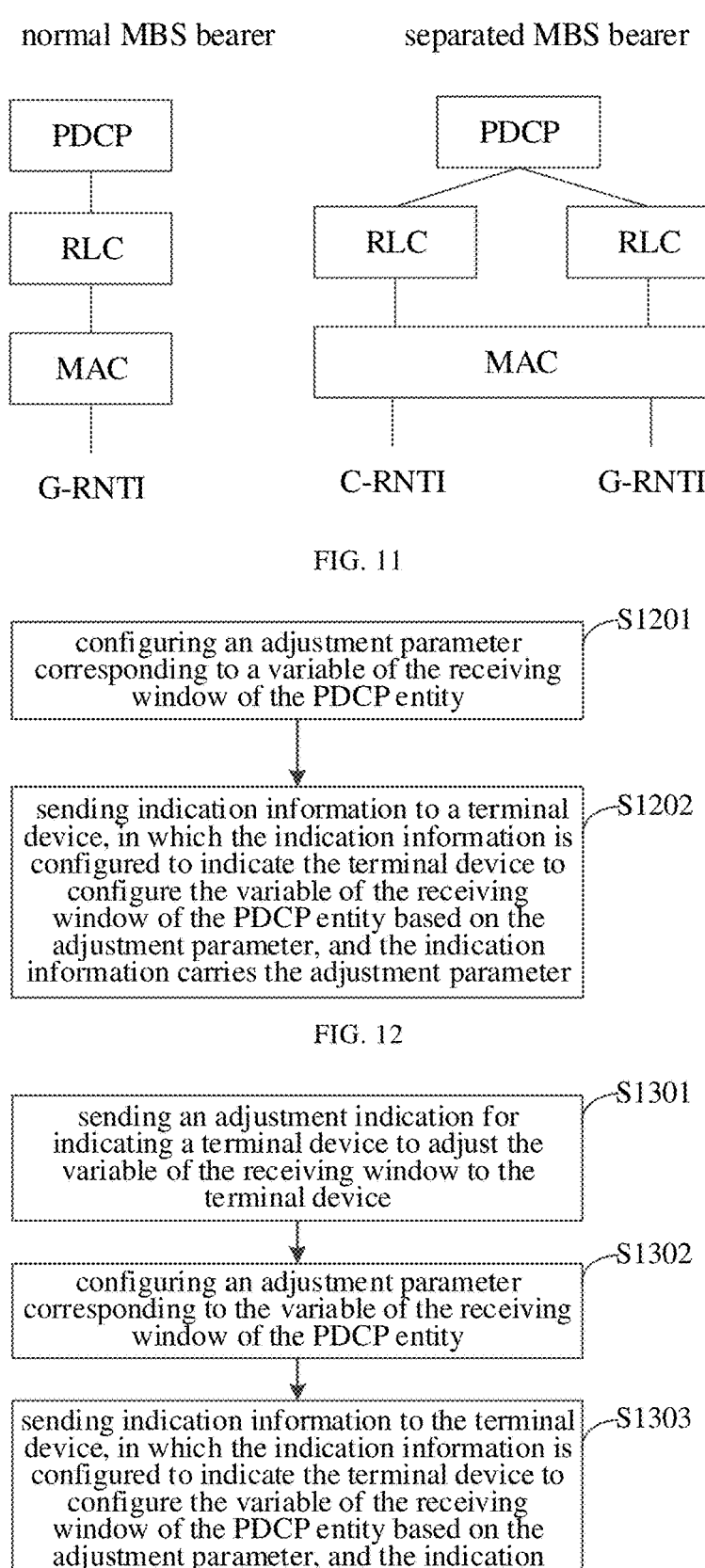

FIG. 11 configuring an adjustment parameter corresponding to a variable of the receiving window of the PDCP entity ⟋S1201 sending indication information to a terminal device, in which the indication information is configured to indicate the terminal device to configure the variable of the receiving window of the PDCP entity based on the adjustment parameter, and the indication information carries the adjustment parameter ⟋S1202

FIG. 12 sending an adjustment indication for indicating a terminal device to adjust the variable of the receiving window to the terminal device ⟋S1301 configuring an adjustment parameter corresponding to the variable of the receiving window of the PDCP entity ⟋S1302 sending indication information to the terminal device, in which the indication information is configured to indicate the terminal device to configure the variable of the receiving window of the PDCP entity based on the adjustment parameter, and the indication information carries the adjustment parameter ⟋S1303

FIG. 13

METHOD AND DEVICE FOR CONFIGURING RECEIVE WINDOW OF PDCP ENTITY

CROSS REFERENCE TO RELATED APPLICATIONS

This application is a U.S. national phase of International Application No. PCT/CN2021/084700, filed on Mar. 31, 2021, the entire contents of which are incorporated herein by reference.

TECHNICAL FIELD

The disclosure relates to a field of communication technologies, in particular to a method for configuring a receiving window of a packet data convergence protocol (PDCP) entity and an apparatus for configuring a receiving window of a PDCP entity.

BACKGROUND

When a terminal device starts to receive service data of a Multicast Broadcast Service (MBS), the terminal device needs to first establish a packet data convergence protocol (PDCP) entity of a MBS Radio Bearer (MRB) corresponding to reception of the MBS service data.

In the related art, a boundary value of a receiving window of a PDCP cannot be updated in real time based on a sequence number of the receiving window of the PDCP, which makes it difficult to realize the reception of the MBS service data when a new user equipment (UE) joins in the reception of the MBS service.

SUMMARY

Embodiments of the disclosure provide a method for configuring a receiving window of a packet data convergence protocol (PDCP) entity and an apparatus for configuring a receiving window of a PDCP entity, to solve problems of low reliability and poor continuity of sending service data of multicast broadcast service (MBS) in the related art.

According to a first aspect, the disclosure provides a method for configuring a receiving window of a PDCP entity, executed by a terminal device. The method includes: determining an adjustment parameter corresponding to a variable of the receiving window of the PDCP entity; and configuring the variable of the receiving window of the PDCP entity based on the adjustment parameter.

According to a second aspect, the disclosure provides a method for configuring a receiving window of a PDCP entity, executed by a network device. The method includes: configuring an adjustment parameter corresponding to a variable of the receiving window of the PDCP entity; and sending indication information to a terminal device, in which the indication information is configured to indicate the terminal device to configure the variable of the receiving window of the PDCP entity based on the adjustment parameter, and the indication information carries the adjustment parameter.

According to a third aspect, the disclosure provides a communication device. The communication device includes: a processor and a memory having computer programs stored thereon. When the processor executes the computer programs stored in the memory, the communication device is caused to implement the method described in the first aspect above.

According to a fourth aspect, the disclosure provides a communication device. The communication device includes: a processor and a memory having computer programs stored thereon. When the processor executes the computer programs stored in the memory, the communication device is caused to implement the method described in the second aspect above.

BRIEF DESCRIPTION OF THE DRAWINGS

A brief description of drawings is given below.

FIG. 4 is a flowchart of a method for configuring a receiving window of a PDCP entity provided by an embodiment of the disclosure.

FIG. 5 is a flowchart of a method for configuring a receiving window of a PDCP entity provided by an embodiment of the disclosure.

FIG. 6 is a flowchart of a method for configuring a receiving window of a PDCP entity provided by an embodiment of the disclosure.

FIG. 7 is a flowchart of a method for configuring a receiving window of a PDCP entity provided by an embodiment of the disclosure.

FIG. 8 is a flowchart of a method for configuring a receiving window of a PDCP entity provided by an embodiment of the disclosure.

FIG. 9 is a flowchart of a method for configuring a receiving window of a PDCP entity provided by an embodiment of the disclosure.

FIG. 10 is a flowchart of a method for configuring a receiving window of a PDCP entity provided by an embodiment of the disclosure.

FIG. 11 is a flowchart of a method for configuring a receiving window of a PDCP entity provided by an embodiment of the disclosure.

FIG. 12 is a flowchart of a method for configuring a receiving window of a PDCP entity provided by an embodiment of the disclosure.

FIG. 13 is a flowchart of a method for configuring a receiving window of a PDCP entity provided by an embodiment of the disclosure.

DETAILED DESCRIPTION

The embodiments of the disclosure are described in detail below, examples of which are shown in the accompanying drawings, in which the same or similar numbers represent the same or similar elements or elements with the same or similar functions. The embodiments described below with reference to the drawings are exemplary and are intended to explain the disclosure, and should not be construed as limiting the disclosure.

For ease of understanding, the terms involved in this disclosure are introduced at first.

Multicast Broadcast Service (MBS)

The MBS can be sent through a physical downlink shared channel (PDSCH) scheduled by a physical downlink control channel (PDCCH). The PDCCH that schedules the MBS may send indication information using a specific MBS scheduling identifier, such as using an MBS Group Radio Network Temporary Identity (G-RNTI).

2. PDCP

The PDCP is an abbreviation for packet data convergence protocol. The PDCP is a radio transmission protocol stack in a Universal Mobile Telecommunication System (UMTS), and it is responsible for compressing and decompressing an internet protocol (IP) header, transmitting user data, and maintaining a serial number (SN) of a radio bearer set for a lossless serving radio network subsystem (SRNS). A PDCP layer belongs to a second layer of a radio interface protocol stack, handling radio resource control (RRC) messages on a control plane and IP packets on a user plane. On the user plane, after a PDCP sublayer obtains IP data packets from an upper layer, it can perform header compression and encryption on the IP data packets, and deliver them to a radio link control (RLC) sublayer. The PDCP sublayer also provides sequential submission and duplicated packet detection functions to the upper layer. On the control plane, the PDCP sublayer provides a signaling transmission service to an upper-layer RRC, and implements encryption and consistency protection for RRC signaling, as well as decryption and consistency checking for RRC signaling in a reverse direction.

In order to better understand the method for configuring a receiving window of a PDCP entity provided in the embodiments of the disclosure, a communication system used in the embodiments of the disclosure is first described below.

Figure 1:
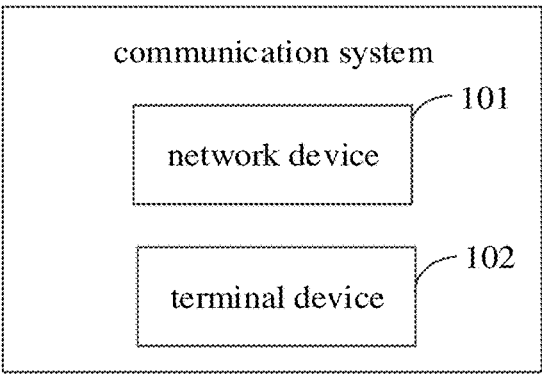
FIG. 1 is a structural diagram of a communication system provided by an embodiment of the disclosure.

As illustrated in FIG. 1, FIG. 1 is a structural diagram of a communication system provided by an embodiment of the disclosure. The communication system may include, but is not limited to, a network device and a terminal device. The number and form of devices shown in FIG. 1 are only for examples and do not constitute a limitation on the embodiments of the disclosure, and two or more network devices and two or more terminal devices may be included in practical applications. The communication system shown in FIG. 1 includes, for example, a network device 101 and a terminal device 102.

It should be noted that the technical solutions of the embodiments of the disclosure can be used in various communication systems, such as, a long term evolution (LTE) system, a 5th generation (5G) mobile communication system, a 5G new radio (NR) system, or other future new mobile communication systems.

The network device 101 in the embodiments of the disclosure is an entity on a network side for transmitting or receiving signals. For example, the network device 101 may be an evolved NodeB (eNB), a transmission reception point (TRP), a next generation NodeB (gNB) in a NR system, a base station in other future mobile communication systems, or an access node in a wireless fidelity (WiFi) system. The specific technology and specific device form adopted by the network device are not limited in the embodiments of the disclosure. The network device provided by the embodiments of the disclosure may be composed of a central unit (CU) and a distributed unit (DU). The CU may also be called a control unit. The use of CU-DU structure allows a protocol layer of the network device, such as a base station, to be split, some functions of the protocol layer are placed in the CU for centralized control, and some or all of the remaining functions of the protocol layer are distributed in the DU, which is intensively controlled by the CU.

The terminal device 102 in the embodiments of the disclosure is an entity on a user side for receiving or transmitting signals, such as a cellular phone. The terminal device may also be referred to as a terminal, a UE, a mobile station (MS), a mobile terminal (MT), and the like. The terminal device can be a car with communication functions, a smart car, a mobile phone, a wearable device, a Pad, a computer with wireless transceiver functions, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, etc. The specific technology and specific device form adopted by the terminal device are not limited in the embodiments of the disclosure.

It is understood that the communication system described in the embodiments of the disclosure is intended to more clearly illustrate the technical solutions of the embodiments of the disclosure, and does not constitute a limitation on the technical solutions provided by the embodiments of the disclosure. It is understood by those skilled in the art that as the system architecture evolves and new business scenarios emerge, the technical solutions provided by the embodiments of the disclosure are also applicable to similar technical problems.

It is understood that multiple solutions of the embodiments of the disclosure may be implemented either individually or in combination, which is not limited in the disclosure.

A method for configuring a receiving window of a PDCP entity and an apparatus for configuring a receiving window of a PDCP entity will be introduced in detail below with reference to the accompanying drawings.

Figure 2:
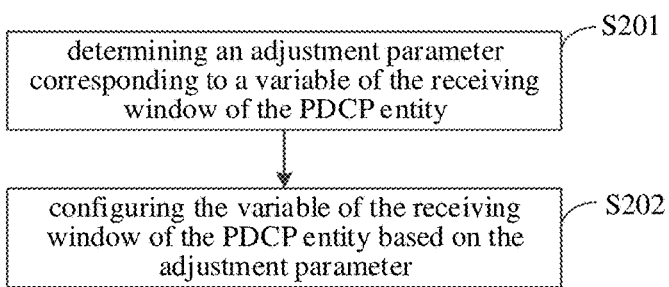
FIG. 2 is a flowchart of a method for configuring a receiving window of a PDCP entity provided by an embodiment of the disclosure.

FIG. 2 is a flowchart of a method for configuring a receiving window of a PDCP entity provided by an embodiment of the disclosure. The method is executed by a terminal device. As illustrated in FIG. 2, the method includes the following steps.

At step S201, an adjustment parameter corresponding to a variable of the receiving window of the PDCP entity is determined.

The PDCP is classified into a receiving entity for data reception and a sending entity for data sending. The receiving entity of the PDCP can reorder received PDU data packets in an order of PDCP sequence number (denoted as COUNT). The reordered PDCP data packets can be delivered to a higher-level protocol entity in sequence according to the COUNT. The PDCP entity can implement data encryption and decryption, timer discarding, immediate retransmission re-establishment, and reordering processing.

Figure 3:
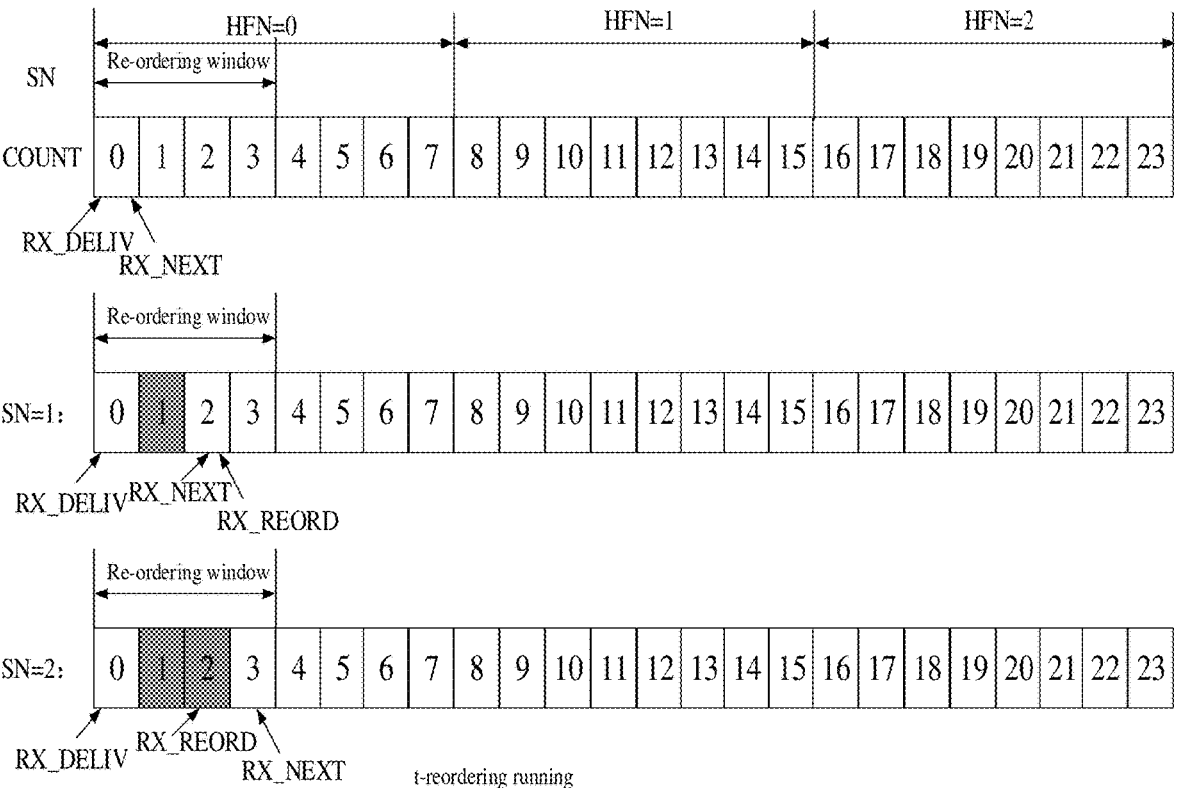
FIG. 3 is a flowchart of a method for configuring a receiving window of a PDCP entity provided by an embodiment of the disclosure.

Optionally, the variable of the receiving window of the PDCP entity may include at least one of the followings: a lower boundary of the receiving window labeled as "RX_DELIV", a COUNT value of a next service data unit (SDU) of a PDCP entity to be received labeled as "RX_NEXT", a hyper frame number (HFN) value of a next SDU data packet of the PDCP entity to be received, and a serial number (SN) value of the next SDU data packet of the PDCP entity to be received. FIG. 3 is a schematic diagram of the receiving window of the PDCP entity. As illustrated in FIG. 3, the variable of the lower boundary of the receiving window is "RX_DELIV", which identifies a data packet number of a first PDU data packet that is not delivered to a higher-level protocol entity. The PDCP entity updates the variable "RX_DELIV" of the lower boundary of the receiving window according to the COUNT of a PDU data packet delivered to the higher-level protocol entity. For a PDU data packet to be received, the PDCP entity may start a reordering timer, and when the reordering timer is expired, the PDCP entity ignores the "COUNT of the PDU data packet to be received" and updates the lower boundary of the receiving window. If the PDCP receives a data packet outside of the receiving window, the PDCP entity discards the data packet. The variable "RX_REORD" identifies a data packet COUNT that starts the reordering timer. The variable "RX_NEXT" identifies a data packet COUNT of the next PDU data packet to be received. As illustrated in FIG. 3, initial values of the variables "RX_DELIV" and "RX_NEXT" of the PDCP entity are 0. When a PDU data packet numbered "1" is received, it means that a PDU data packet numbered "0" is not received. The PDCP entity updates the "RX_NEXT" to "2". In response to the need to start the reordering timer, the "RX_REORD" is set to "2". When a PDU data packet numbered "2" is received, the "RX_NEXT" is updated to "3".

Optionally, the adjustment parameter of the variable of the receiving window of the PDCP entity may include at least one of the followings: a window length of the receiving window, a boundary value of the receiving window, a HFN value in a header of a first data packet received by the PDCP entity, a SN value in the header of the first data packet, and a COUNT value in the header of the first data packet.

In some implementations, the terminal device may determine the adjustment parameter corresponding to the variable of the receiving window of the PDCP entity according to an indication of the network device. In other implementations, the terminal device may determine the adjustment parameter corresponding to the variable of the receiving window of the PDCP entity according to protocol agreements.

At step S202, the variable of the receiving window of the PDCP entity is configured based on the adjustment parameter.

In the embodiment of the disclosure, after the terminal device determines the adjustment parameter which is used to adjust the variable of the receiving window, it may configure the variable of the receiving window of the PDCP entity according to the adjustment parameter. Optionally, the terminal device may directly configure the variable of the receiving window of the PDCP entity according to the determined adjustment parameter. Optionally, the terminal device and the network device make an agreement to agree on a calculation equation for calculating the adjustment parameter. After determining the adjustment parameter, a specific configuration value of the variable of the receiving window of the PDCP entity can be calculate based on the calculation equation agreed on in the protocol, and the variable of the receiving window of the PDCP entity is configured based on the calculated configuration value.

According to the method for configuring a receiving window of a PDCP entity of the disclosure, the terminal device determines the adjustment parameter corresponding to the variable of the receiving window of the PDCP entity, and adjusts the configuration of the variable of the receiving window of the PDCP entity based on the obtained adjustment parameter. In the disclosure, the variable of the receiving window of the PDCP entity is adjusted based on the received adjustment parameter, realizing timely update of the variable of the receiving window of the PDCP entity, so that a new terminal device can join in at any time to receive MBS data, ensuring the continuity and reliability of MBS data transmission.

FIG. 4 is a flowchart of a method for configuring a receiving window of a PDCP entity provided by an embodiment of the disclosure. The method is executed by a terminal device. As illustrated in FIG. 4, the method includes the following steps.

At step S401, an adjustment parameter corresponding to a variable of the receiving window of the PDCP entity is determined.

In an implementation, the terminal device may receive indication information sent by the network device, and the indication information carries the adjustment parameter.

In the embodiment of the disclosure, the network device may send the indication information to the terminal device. The indication information carries the adjustment parameter, which may be used to adjust the variable of the receiving window of the PDCP entity. Correspondingly, the terminal device may receive the indication information carrying the adjustment parameter sent by the network device. Specific descriptions of the adjustment parameter can be referred to the records of the relevant contents in the various embodiments of the disclosure and will not be repeated herein.

Optionally, the terminal device may receive a broadcast message sent by the network device, in which the broadcast message carries the indication information. For example, the network device may configure a PDCP entity of an MRB-1 for the terminal device via a RRC signaling. It is understood that the adjustment parameter corresponding to the variable of the receiving window of the PDCP entity is carried in the RRC signaling. The terminal device receives the RRC signaling sent by the network device and determines the adjustment parameter corresponding to the variable of the receiving window of the PDCP entity.

Optionally, the terminal device may receive an MBS control channel message, which is used to carry the indication information. For example, the network device may send the MBS control signaling via a Multimedia Control Channel (MCCH), which is a logical channel of a radio interface. The network device may configure a PDCP entity of an MRB-1 for the terminal device by sending the control signaling via the MCCH. It is understood that the control signaling carries the adjustment parameter corresponding to the variable of the receiving window, and the terminal device receives the control signaling sent by the network device and determines the adjustment parameter corresponding to the variable of the receiving window of the PDCP entity.

In some implementations, the adjustment parameter sent by the network device may include a length of the receiving window or a boundary value of the receiving window, or may include both the length of the receiving window and the boundary value of the receiving window. The boundary value of the receiving window may be a candidate lower boundary value of the receiving window or a candidate upper boundary value of the receiving window, or may include both the candidate upper boundary value of the receiving window and the candidate lower boundary value of the receiving window.

At step S402, in response to the adjustment parameter including a window length and/or a boundary value of the receiving window, the variable of the receiving window is configured according to the window length and/or the boundary value.

Optionally, in response to the boundary value being the candidate lower boundary value of the receiving window, the terminal device may adjust the variable of the receiving window based on the candidate lower boundary value. In an implementation, the terminal device may directly configure the lower boundary value of the receiving window to be the candidate lower boundary value, i.e., the terminal device configures the RX_DELIV to be the candidate lower boundary value.

For example, if the candidate lower boundary value of the receiving window carried in the indication information sent by the network device is set to 4, i.e., RX_DELIV=4, for sending through multicast, the network device can configure the PDCP entity of the MRB-1 for the terminal device via a RRC signaling. The RRC signaling carries the candidate lower boundary value of the receiving window of the PDCP entity. Thus, the terminal device can configure the lower boundary value of the receiving window of the PDCP entity to be 4, i.e., RX_DELIV=4, in which the MRB-1 can be an MBS bearer identifier, and the RRC signaling can be a RRC connection reconfiguration signaling.

For another example, if the candidate lower boundary value of the receiving window to be carried in the indication information sent by the network device is set to 4, i.e., RX_DELIV=4, for sending through broadcast, the network device may send a control signaling via the MCCH to configure the PDCP entity of the MRB-1 for the terminal device, in which the control signaling carries the candidate lower boundary value of the receiving window of the PDCP entity. Thus, the terminal device may configure the lower boundary value of the receiving window of the PDCP entity to 4, i.e., RX_DELIV=4.

Optionally, in response to the boundary value being the candidate upper boundary value of the receiving window, the variable of the receiving window is adjusted according to the window length and the candidate upper boundary value. In an implementation, the terminal device determines the candidate lower boundary value of the receiving window according to the window length and the candidate upper boundary value, and configures the lower boundary value of the receiving window to be the candidate lower boundary value. That is, when the adjustment parameter corresponding to the variable of the receiving window received by the terminal device and sent by the network device is the candidate upper boundary value of the receiving window, in order to adjust and configure the lower boundary value of the receiving window, the terminal device may directly configure a value of the variable of the lower boundary of the receiving window to be the candidate lower boundary value according to the window length of the receiving window and the candidate lower boundary value, that is, the terminal device configures the RX_DELIV to be the candidate lower boundary value.

For example, if the candidate upper boundary value of the receiving window carried in the indication information sent by the network device is 7 and the length of the receiving window of the PDCP entity is 4, for sending through multicast, the network device can configure the PDCP entity of the MRB-1 for the terminal device through the RRC signaling, which carries the candidate upper boundary value of 7 of the receiving window. Based on the obtained candidate upper boundary value of the receiving window and the window length of the receiving window of the PDCP entity, the terminal device can determine the candidate lower boundary value of the receiving window of the PDCP entity as 4, i.e., RX_DELIV=(7−window_size+1)=(7−4+1)=4. The terminal device configures the RX_DELIV of the receiving window to be the candidate lower boundary value. For another example, if the candidate upper boundary value of the receiving window carried in the indication information sent by the network device is 7 and the length of the receiving window of the PDCP entity is 4, for sending through broadcast, the network device can configure the PDCP entity of the MRB-1 for the terminal device by sending the control signaling through the MCCH. The control signaling carries the candidate upper boundary value of 7 of the receiving window. Based on the obtained candidate upper boundary value of the receiving window and the window length of the receiving window of the PDCP entity, the terminal device can determine the candidate lower boundary value of the receiving window of the PDCP entity as 4, i.e., RX_DELIV=(7−window_size+1)=(7−4+1)=4. The terminal device configures the RX_DELIV of the receiving window to be the candidate lower boundary value.

According to the method for configuring a receiving window of a PDCP entity of the disclosure, the terminal device receives the indication information carrying the adjustment parameter sent by the network device, and realizes the adjustment of the lower boundary value of the receiving window of the PDCP entity based on the acquired adjustment parameter. In the disclosure, the adjustment of the lower boundary value of the receiving window can be realized based on the acquired candidate lower boundary value or the candidate upper boundary value and the window length sent by the network device, and the variable of the receiving window of the PDCP entity can be updated timely, so that new terminal devices can join in at any time to perform the reception of MBS data, and the continuity and reliability of MBS data transmission can be ensured.

In the above embodiment, the method for configuring a receiving window of a PDCP entity may also include FIG. 5, FIG. 5 is a flowchart of a method for configuring a receiving window of a PDCP entity provided by an embodiment of the disclosure. The method is executed by a terminal device. As illustrated in FIG. 5, the method includes the following steps.

At step S501, an adjustment parameter corresponding to a variable of the receiving window of the PDCP entity is determined.

Step S501 can be referred to the records of the relevant contents of any embodiment of the disclosure and will not be repeated herein.

Optionally, the adjustment parameter includes a candidate sequence number of a next PDCP SDU to be received.

At step S502, in response to the adjustment parameter including a candidate sequence number of a next PDCP SDU to be received, a sequence number of the next PDCP SDU to be received of the receiving window is configured to be the candidate sequence number.

In the embodiment of the disclosure, in response to the obtained adjustment parameter being the candidate sequence number of the next PDCP SDU to be received, the terminal device can adjust the variable of the receiving window of the PDCP entity based on the candidate sequence number of the SDU. In the implementation, the terminal device can directly configure the sequence number of the next PDCP SDU to be received corresponding to the receiving window of the PDCP entity to be the candidate sequence number of the SDU, that is, the terminal device configures the RX_NEXT of the receiving window to be the candidate sequence number.

For example, if the candidate configuration value of the COUNT of the next PDCP SDU to be received is set to 4, i.e., RX_NEXT=4, for sending through multicast, the network device can configure the PDCP entity of the MRB-1 for the terminal device by the RRC signaling, which carries the candidate configuration value of the COUNT of the next PDCP SDU to be received of the receiving window. The terminal device may determine that the COUNT of the next PDCP SDU to be received of the receiving window of the PDCP entity is 4. The terminal device configures the COUNT of the next PCDP SDU to be received of the receiving window to be 4, i.e., configuring RX_NEXT=4.

For another example, if the candidate configuration value of the COUNT of the next PDCP SDU to be received is set to 4, i.e., RX_NEXT=4, for sending through broadcast, the network device may send a control signaling via the MCCH to configure the PDCP entity of the MRB-1 for the terminal device, and the control signaling carries the candidate configuration value of the COUNT of the next PDCP SDU to be received. The terminal device may determine that the COUNT of the next PDCP SDU to be received of the received window of the PDCP entity is 4. Further, the terminal device configures the COUNT of the next PDCP SDU to be received to be 4, i.e., RX_NEXT=4.

According to the method for configuring a receiving window of a PDCP entity of the disclosure, the sequence number of the next PDCP SDU to be received is configured to be the candidate sequence number, which can realize the adjustment of the sequence number of the SDU of the PCDP entity, so as to realize the timely update of the variable of the receiving window of the PDCP entity, so that a new terminal device can join in at any time to receive MBS data, and the continuity and reliability of MBS data transmission can be ensured.

FIG. 6 is a flowchart of a method for configuring a receiving window of a PDCP entity provided by an embodiment of the disclosure. The method is executed by a terminal device. As illustrated in FIG. 6, the method includes the following steps.

At step S601, an adjustment parameter corresponding to a variable of the receiving window of the PDCP entity is determined.

Step S601 may be referred to the above relevant detailed contents and will not be repeated here.

Optionally, the adjustment parameter includes a HFN value of the next PDCP SDU to be received.

At step S602, in response to the adjustment parameter including a HFN value, a SN value in a header of a first PDCP data packet received by the PDCP entity is determined.

The sequence number (COUNT) of the next PDCP SDU to be received consists of the HFN value and a PDCP SN value together. As illustrated in FIG. 7, the PDCP SN value may be determined by the SN value carried in the header of the first PDCP data packet, and the HFN value may be indicated to the terminal device by the network device via an RRC signaling or a control signaling sent through the MCCH. In the embodiment of the disclosure, in order to determine the COUNT of the next PDCP SDU to be received, it is understood that the adjustment parameter may also include the SN value. The PDCP entity on the terminal device side may receive a PDCP data packet sent by the network device. When receiving the first PDCP data packet, the terminal device may determine the SN value in the adjustment parameter based on the SN value carried in the header of the first PDCP data packet.

It should be noted that the PDCP SN value may be flipped after reaching a maximum value, and in this scenario, the HFN value is added by one. For example, the PDCP SN value is set within a range of 0 to 7, and the HFN value is 0 before PDCP SN=7. Thus, the HFN value is 1 after PDCP SN=7.

At step S603, the variable of the receiving window is configured according to the HFN value and the SN value.

In the embodiment of the disclosure, the terminal device may adjust the variable of the receiving window of the PDCP entity based on the adjustment parameters, i.e., the SN value and the HFN value. The adjusted variable of the receiving window may be the lower boundary value of the receiving window or the sequence number of the next PDCP SDU to be received.

Further, a HFN portion of the variable of the receiving window is configured according to the HFN value.

Optionally, the HFN portion of the lower boundary value of the receiving window and/or the sequence number of the next PDCP SDU to be received is configured to be the HFN value.

After acquiring the HFN value configured by the network device, the terminal device adjusts the configuration of the HFN portion included in the lower boundary value of the receiving window and/or the sequence number of the next PDCP SDU to be received based on the acquired HFN value. In some implementations, the configuration may also be adjusted according to the lower boundary value of the receiving window and other parameters. In other implementations, the configuration may also be adjusted according to the HFN portion included in the sequence number of the next PDCP SDU to be received and other parameters.

For example, a value of the HFN portion of the lower boundary value of the receiving window in the current state is set to 1, and the HFN value is configured to be 2 by the network device through the RRC signaling, thus the value of the HFN portion of the lower boundary value of the receiving window is adjusted to 2 based on the acquired HFN value of 2.

For another example, the value of the HFN portion of the sequence number of the next PDCP SDU to be received of the PDCP entity in the current state is set to 2, and the HFN value is configured to be 3 by the network device through the RRC signaling, thus the value of the HFN portion of the sequence number of the next PDCP SDU to be received of the PDCP entity is adjusted to 3 based on the acquired HFN value of 3.

Further, a SN portion of the variable of the receiving window is configured according to the SN value.

In an implementation, a first sum of the SN value and a first target value is determined. The first target value is an integer indicated by the network device or agreed upon by the protocol.

The terminal device receives the first PDCP data packet, and obtains the SN value by parsing it from the header of the first PDCP data packet. The SN value in the header and the first target value are added together to obtain a result value as the first sum. Further, the SN portion of the variable of the receiving window is configured according to the first sum.

For example, the first target value is set to be a, the SN value in the header of the first PDCP data packet received by the terminal device is 3, and the first target value a=1, thus the first sum is 3+1=4.

Optionally, different conditions may be set in advance according to a maximum allowable value of the SN value, and the SN portion may correspond to different candidate configuration values when different conditions are satisfied. The terminal device may first determine a target condition satisfied by the first sum, and determine a configuration value corresponding to the target condition as the candidate configuration value for configuring the variable of the receiving window. Further, the terminal device configures the SN portion of the lower boundary value of the receiving window and/or the sequence number of the next PDCP SDU to be received to be the candidate configuration value.

In some implementations, in response to a target condition that the first sum is greater than the maximum allowable value of the SN value being satisfied, the candidate configuration value is determined as 0. Further, the terminal device configures the value of the SN portion of the variable of the receiving window to be 0. That is, the terminal device may configure the SN portion of the lower boundary value RX_DELIV of the receiving window to be 0, or configure the SN portion of the sequence number RX_NEXT of the next PDCP SDU to be received to be 0.

For example, the SN value of the PDCP is set within a range of 0 to 7, and the header of the first PDCP data packet of the MRB received by the terminal device indicates that SN=7 and a=1, thus the first sum is 7+1=8. At this time, the first sum is greater than a maximum value that can be taken as the value of the SN value of the PDCP. Thus, 0 is determined as the candidate configuration value for the SN portion of the variable of the receiving window. For example, the candidate configuration value of the SN portion of the lower boundary value RX_DELIV of the receiving window may be 0, or the candidate configuration value of the SN portion of the sequence number RX_NEXT of the next PDCP SDU to be received may be 0.

In other implementations, in response to a target condition that the first sum is less than 0 being satisfied, a second sum of the maximum allowable value of the SN value, the first sum and a second target value is determined, and the second sum is determined as the candidate configuration value. Further, the terminal device configures the value of the SN portion of the variable of the receiving window to be the second sum. That is, the terminal device may configure the SN portion of the lower boundary value RX_DELIV of the receiving window to be the second sum, or configure the SN portion of the sequence number RX_NEXT of the next PDCP SDU to be received to be the second sum.

In the embodiment of the disclosure, the network device may configure another integer for the header of the first PDCP data packet received by the PDCP entity. The integer may also be agreed upon by a pre-signed agreement as the second target value. The maximum allowable value of the PDCP SN value, the first sum, and the second target value may be added together to obtain the second sum.

When the first sum is less than 0, the second sum may be determined as the adjusted candidate configuration value of the SN portion in the variable of the receiving window.

For example, the SN value of the PDCP is set within the range of 0 to 7, the second target value is b, the header of the first PDCP data packet of the MRB received by the terminal device indicates that SN=1, a=−2 and b=1, and the maximum allowable value of the SN value of the PDCP entity is 7. At this time, the first sum is −2+1=−1, which is less than 0, thus, the terminal device may obtain the second sum according to the maximum allowable value of the SN value, the first sum and the second target value by 7+1−2+1=7. Further, the second sum of 7 is determined as the adjusted candidate configuration value of the SN portion of the variable of the receiving window. For example, the candidate configuration value of the SN portion of the lower boundary value RX_DELIV of the receiving window may be 7, or the candidate configuration value of the SN portion of the sequence number RX_NEXT of the next PDCP SDU to be received may be 7.

In some implementations, in response to a target condition that the first sum is greater than half of the maximum allowable value, the first sum is determined as the candidate configuration value. Further, the terminal device configures the value of the SN portion of the variable of the receiving window to be the first sum. That is, the terminal device may configure the SN portion of the lower boundary value RX_DELIV of the receiving window to be the first sum, or may configure the SN portion of the sequence number RX_NEXT of the next PDCP SDU to be received to be the first sum.

In the embodiment of the disclosure, when the first sum is greater than a maximum value in a first half of available values in a value range of the SN value in the PDCP, the first sum can be determined as an adjusted candidate configuration value for the SN portion of the variable of the receiving window.

For example, the SN value of the PDCP is set within the value range of 0 to 7, the header of the first PDCP data packet of the MRB received by the terminal device indicates that SN=4 and a=1, thus the first half of available values in a value range of the SN value is 0 to 3, in which a half of the maximum allowable value is 3. The first sum is obtained as 4+1=5 based on SN=4 and a=1 in the header of the first PDCP data packet, and the first sum is greater than the half of the maximum allowable value 3 of the SN value. Further, the terminal device determines the first sum as the adjusted candidate configuration value of the SN portion of the variable of the receiving window. For example, the candidate configuration value of the SN portion of the lower boundary value RX_DELIV of the receiving window may be 5, or the candidate configuration value of the SN portion of the sequence number RX_NEXT of the next PDCP SDU to be received may be 5.

Further, after determining the candidate configuration value of the SN portion of the variable of the receiving window, the value of the SN portion of a certain variable of the receiving window may be adjusted based on the obtained candidate configuration value.

Optionally, when the candidate configuration value is 0, the SN portion of the lower boundary value RX_DELIV of the receiving window may be configured to 0, or the SN portion of the sequence number RX_NEXT of the next PDCP SDU to be received may be configured to 0.

Optionally, when the candidate configuration value is the second sum, and the second sum is 7, the SN portion of the lower boundary value RX_DELIV of the receiving window may be configured to 7, or the SN portion of the sequence number RX_NEXT of the next PDCP SDU to be received may be configured to 7.

Optionally, when the candidate configuration value is the first sum, and the first sum is 7, the SN portion of the lower boundary value RX_DELIV of the receiving window may be configured to 7, or the SN portion of the sequence number RX_NEXT of the next PDCP SDU to be received may be configured to 7.

It is noted that through the reasonable configuration of the first target value and the second target value, the lower boundary value of the receiving window of the PDCP entity can remain within a reasonable range after new terminal devices are accepted to join in, thereby effectively reducing the loss of data packets.

According to the method for configuring a receiving window of a PDCP entity of the disclosure, the variable of the receiving window of the PDCP entity is adjusted based on the obtained SN value and the HFN value, realizing timely update of the variable of the receiving window of the PDCP entity, so that a new terminal device can join in at any time to receive MBS data, ensuring the continuity and reliability of MBS data transmission.

FIG. 8 is a flowchart of a method for configuring a receiving window of a PDCP entity provided by an embodiment of the disclosure. The method is executed by a terminal device. As illustrated in FIG. 8, the method includes the following steps.

At step S801, a sequence number carried in a header of a first PDCP data packet received by the PDCP entity is determined as an adjustment parameter.

In the embodiment of the disclosure, the sequence number can be indicated directly to the terminal device by changing the content of the header of the first PDCP data packet received by the PDCP entity, and the sequence number is used as the adjustment parameter of the variable of the receiving window.

At step S802, the variable of the receiving window is configured according to the sequence number carried in the header.

In the embodiment of the disclosure, the configuration of the variable of the receiving window can be adjusted according to the obtained adjustment parameter.

Optionally, a lower boundary value of the receiving window and/or a sequence number of a next PDCP SDU to be received is configured to be the sequence number carried in the header.

For example, a sequence number indicated in the header of the first PDCP data packet is 4, a SN portion of the lower boundary value RX_DELIV of the receiving window is configured to be 4, or a SN portion of the sequence number RX_NEXT of the next PDCP SDU to be received is configured to be 4.

Optionally, a third sum of the sequence number carried in the header and a third target value is determined, and the lower boundary value of the receiving window and/or the sequence number of the next PDCP SDU to be received is configured to be the third sum.

In the embodiment of the disclosure, the network device may configure another integer for the header of the first PDCP data packet received by the PDCP entity. The integer may also be agreed upon by a pre-signed agreement, as the third target value. The sequence number indicated in the header of the first PDCP data packet and the third target value may be added together to obtain the third sum.

For example, the sequence number indicated in the header of the first PDCP data packet is set to 4, and the third target value c is 1, thus the third sum is 4+1=5. Further, the SN portion of the lower boundary value RX_DELIV of the receiving window can be configured as 5, or the SN portion of the sequence number RX_NEXT of the next PDCP SDU to be received can be configured as 5.

It is noted that, with the reasonable configuration of the third target value, the lower boundary value of the receiving window of the PDCP entity can maintain within a reasonable range after a new terminal device is accepted to join in, thereby effectively reducing the loss of data packets.

According to the method for configuring a receiving window of a PDCP entity of the disclosure, the sequence number indicated in the header of the first PDCP data packet is used as the candidate configuration value for adjusting the configuration of the variable of the receiving window, realizing timely update of the variable of the receiving window of the PDCP entity, so that a new terminal device can join in at any time to receive MBS data, and the continuity and reliability of MBS data transmission can be ensured.

FIG. 9 is a flowchart of a method for configuring a receiving window of a PDCP entity provided by an embodiment of the disclosure. The method is executed by a terminal device. As illustrated in FIG. 9, the method includes the following steps.

At step S901, indication information sent by a network device is received, in which the indication information carries the adjustment parameter.

Step S901 may be referred to the above relevant detailed contents and will not be repeated here.

At step S902, it is determined that a trigger event for adjusting the variable of the receiving window is satisfied.

In the embodiment of the disclosure, the variable of the receiving window of the PDCP entity may be adjusted in response to the trigger event. The trigger event may be configured by the network device or may be agreed upon by a preset protocol.

In an implementation, the trigger event is receiving an adjustment indication sent by the network device. The adjustment indication is used to indicate the terminal device to adjust the variable of the receiving window.

In the embodiment of the disclosure, the network device can indicate the configuration of the trigger event to the terminal device, and the terminal device starts to adjust the variable of the receiving window based on the obtained adjustment indication.

In another implementation, the trigger event is establishing a new PDCP entity of an MRB.

In the embodiment of the disclosure, establishing the new PDCP entity of the MRB may be used as the trigger event. When starting to establish the new PDCP entity of the MRB, an indication for starting the adjustment can be triggered and sent to the terminal device. The terminal device starts to adjust the variable of the receiving window based on the acquired indication.

In another implementation, the trigger event is re-establishing or reconfiguring a PDCP entity of the MRB.

In the embodiment of the disclosure, re-establishing or reconfiguring the PDCP entity of the MRB is determined as the trigger event, re-establishing and reconfiguring have the same function in implementation.

The MBS may be sent over a specific MRB, in which a protocol stack structure of a radio bearer that carries the MBS may be either a normal MBS bearer or a separated MBS bearer.

The normal MBS bearer includes 1 PDCP, which is associated to 1 RLC entity. The data of the RLC entity is sent via G-RNTI PDCCH scheduling. The separated MBS bearer includes 1 PDCP, which is associated with 2 RLC entities. The data of one RLC entity is sent via G-RNTI PDCCH scheduling, which can be understood as a multicast bearer, and the data of the other RLC entity is sent via Cell-Radio Network Temporary Identifier (C-RNTI) PDCCH scheduling, which can be understood as a unicast bearer. Certainly, the above embodiments do not exclude an implementation where 1 PDCP is associated to more than two RLC entities, and the principle is the same as the separated MBS bearer where 1 PDCP is associated to two RLC entities, and will not be repeated herein.

Optionally, reconfiguration of the PDCP entity of the MRB may be reconfiguring from "unicast bearer" to "multicast bearer".

For example, a current MBS-1 is sent via the MRB-1, the network device reconfigures a sending mode of the MBS-1. The sending mode of the MBS-1 is reconfigured, through a RRC signaling, as sending via the MRB-1.

At this time, the reconfiguring operation can be determined as the trigger event, to start to adjust the variable of the receiving window.

Optionally, reconfiguration of the PDCP entity of the MRB may be reconfiguring from "separated MBS bearer" to "normal MBS bearer".

For example, the current MBS-1 is sent through the MRB-1, and a bearer type of the MRB-1 is "separated MBS bearer". The network device reconfigures the bearer type of the MRB-1 to "normal MBS bearer" via a RRC signaling.

At this time, the reconfiguration operation can be used as the trigger event to start adjusting the variable of the receiving window.

Optionally, the reconfiguration of the PDCP entity of the MRB can be switching the data reception of the "separated MBS bearer" from a unicast path to a multicast path.

For example, the current MBS-1 is sent through the MRB-1, and the bearer type of the MRB-1 is "separated MBS bearer", which includes a unicast path and a multicast path. The terminal device receives the MBS-1 through the unicast path of the MRB-1. The network device changes, by sending an indication signaling, the reception path of the MRB-1 for the MBS-1 from the unicast path to the multicast path.

At this time, the reconfiguration operation can be used as the trigger event to start adjusting the variable of the receiving window.

It is noted that the above-described trigger event may include at least one of the above-described steps S802 to S804.

At step S903, the variable of the receiving window of the PDCP entity is configured based on the adjustment parameter.

In the embodiment of the disclosure, after the occurrence of the trigger event, the terminal device can start to adjust the variable of the receiving window of the PDCP entity in response to the occurrence of the trigger event, and the detailed adjustment method can be referred to the above relevant detailed contents, which will not be repeated here.

According to the method for configuring a receiving window of a PDCP entity of the disclosure, the adjustment of the variable of the receiving window of the PDCP entity can be started based on the trigger event, which ensures stable implementation of updating the variable of the receiving window, and ensures the continuity and reliability of MBS data transmission.

FIG. 10 is a flowchart of a method for configuring a receiving window of a PDCP entity provided by an embodiment of the disclosure. As illustrated in FIG. 10, the method includes the following steps.

At step S1001, multicast bearer configuration information sent by a network device for configuring an MBS is received.

In the embodiment of the disclosure, the terminal device receives the configuration information sent by the network device, and the configuration information is configured to configure the multicast bearer configuration information of the MBS.

The multicast bearer configuration information includes: MBS information. The MBS information includes at least one of the followings.

Optionally, the MBS information may be an MBS identifier.

In the implementation, the MBS may be sent via a PDSCH scheduled by a PDCCH. The PDCCH used for scheduling the MBS may be indicated by a specific scheduling identifier of the MBS. The MBS identifier may be a Temporary Mobile Group Identity (TMGI), an MBS session Identity (ID), or an MBS quality of service (QoS) flow ID.

Optionally, the MBS information may be an MBS bearer identifier, for example, MRB-1.

Optionally, the MBS information may be protocol entity configuration of the MBS bearer, for example, PDCP configuration.

At step S1002, an MRB and a PDCP entity corresponding to the MRB are established according to the multicast bearer configuration information.

The MBS may be sent through a specific MRB. The MRB that is capable to carry the MBS may include a normal MBS bearer or a separated MBS bearer. As illustrated in FIG. 11, the normal MBS bearer includes 1 PDCP, which is associated to 1 RLC entity. The data of the RLC entity is sent via G-RNTI PDCCH scheduling. The separated MBS bearer includes 1 PDCP, which is associated with 2 RLC entities. The data of one RLC entity is sent via G-RNTI PDCCH scheduling, i.e., multicast, and the data of the other RLC entity is sent via C-RNTI PDCCH scheduling, i.e., unicast.

In the embodiment of the disclosure, the terminal device may establish a PDCP entity to realize the reception of MBS sending information. According to the multicast bearer configuration information, the MRB is established, and the corresponding PDCP entity is established based on the MRB.

Optionally, for the multicast sending mode, the MRB may use the normal MBS bearer. Further, the corresponding PDCP entity is established based on the structure of the normal MBS bearer. The network device sends the MBS configuration information to the terminal device through a signaling corresponding to the terminal device.

Optionally, for the broadcast sending mode, the MBS can use the normal MBS bearer or the separated MBS bearer, and the corresponding PDCP entity can be established. In this scenario, the network device sends the MBS configuration information to the terminal device via system information and MBS control channel information.

At step S1003, an adjustment parameter corresponding to a variable of the receiving window of the PDCP entity is determined.

At step S1004, the variable of the receiving window of the PDCP entity is configured based on the adjustment parameter.

Steps S1003 to Step S1004 can be referred to the above relevant detailed contents and will not be repeated here.

According to the method for configuring a receiving window of a PDCP entity of the disclosure, the corresponding PDCP entities are established based on different MRBs, which provide bearers for the terminal device to receive the MBS information, which ensures stable implementation of updating the variable of the receiving window, and ensures the continuity and reliability of MBS data transmission.

In order to implement the method for configuring a receiving window of a PDCP entity of the embodiments, the disclosure also provides another method for configuring a receiving window of a PDCP entity. The method is executed by a network device. As illustrated in FIG. 12, FIG. 12 is a flowchart of a method for configuring a receiving window of a PDCP entity provided by an embodiment of the disclosure. The method includes the following steps.

At step S1201, an adjustment parameter corresponding to a variable of the receiving window of the PDCP entity is configured.

In the embodiment of the disclosure, in order for a new terminal device to join in at any time to receive MBS data, the receiving window of the PDCP entity needs to be adjusted in real time according to the accession condition of the terminal device. Further, the network device configures the adjustment parameter of the variable of the receiving window of the PDCP entity of a particular bearer for the terminal device based on the dynamic adjustment of the terminal device.

Optionally, the variable of the receiving window may include one of or at least one of: a window length of the receiving window, a boundary value of the receiving window, a HFN value in a header of a first data packet received by the PDCP entity, a SN value in the header of the first data packet, and a COUNT value in the header of the first data packet.

Optionally, the adjustment parameter of the variable of the receiving window may include one of or at least one of: a candidate configuration value of the window length of the receiving window, a candidate configuration value of the boundary value of the receiving window, a candidate configuration value of the HFN value in the header of the first data packet received by the PDCP entity, a candidate configuration value of the SN value in the header of the first data packet, and a candidate configuration value of the COUNT value in the header of the first data packet.

Optionally, the adjustment parameter includes a window length and/or a boundary value of the receiving window.

In the embodiment of the disclosure, changes in the lower boundary value of the receiving window can affect the number of terminal devices that can be accommodated within it. The network device can configure the adjustment parameter for the terminal device based on the demand for the capacity of accommodating terminal devices in the receiving window. In order to realize the adjustment of the lower boundary value of the receiving window, the adjustment parameter configured by the network device and sent to the terminal device may include the candidate configuration value of the lower boundary value, a candidate configuration value of an upper boundary value and the window length. The terminal device can obtain a candidate configuration value of the lower boundary value based on the obtained candidate configuration value of the upper boundary value and the window length, so as to achieve the purpose of adjusting the lower boundary value of the receiving window.

Optionally, the adjustment parameter includes a candidate sequence number of a next PDCP SDU to be received.

In the embodiment of the disclosure, the sequence number of the next PDCP SDU to be received is composed of a SN value and a HFN value. The terminal device may realize the adjustment of a SN portion of the variable of the receiving window based on the SN value carried in the sequence number of the next PCDP SDU to be received, and it may realize the adjustment of a HFN portion of the variable of the receiving window based on the HFN value carried in the sequence number of the next PCDP SDU to be received, and further realize the adjustment of the variable of the receiving window.

Further, the adjustment parameter may include a HFN value.

To adjust the HFN portion of the variable of the receiving window, the network device may configure the HFN value for the terminal device via a RRC signaling.

The adjustment parameter may include the sequence number carried in the header of the first PDCP data packet received by the PDCP entity.

The candidate configuration value of the SN portion of the variable of the receiving window may be determined based on the SN value carried in the sequence number of the next PDCP SDU to be received. Further, the SN value in the sequence number of the next PDCP SDU to be received may be determined by the SN value carried in the header of the first PDCP data packet received by the PDCP entity. In order to realize the adjustment of the SN portion of the variable of the receiving window, the network device may configure the SN value in the header of the first PDCP data packet received by the terminal device.

At step S1202, indication information is sent to a terminal device, in which the indication information is configured to indicate the terminal device to configure the variable of the receiving window of the PDCP entity based on the adjustment parameter, and the indication information carries the adjustment parameter.

In the embodiment of the disclosure, the network device generates the indication information based on the adjustment parameter configured for the variable of the receiving window of the PDCP entity to be received, and sends the indication information to the terminal device, so that the terminal device can realize the adjustment of the variable of the receiving window based on the adjustment parameter carried in the indication information.

The network device sends a broadcast message or an MBS control channel message to the terminal device, in which the broadcast message or MBS control channel message is used to carry the indication information.

The network device may send the broadcast message or the MBS control channel message to the terminal device, and the indication information may be carried in the broadcast message or the MBS control channel message. The terminal device obtains the indication information carrying the adjustment parameter based on the obtained broadcast message or MBS control channel message, and completes the adjustment of the variable of the receiving window.

Optionally, a normal MBS bearer can be used to select a sending mode of the MBS, to facilitate the network device to send the configuration information to the terminal device. The terminal device enters a connected state and receives the configuration information sent by the MBS for the purpose of receiving the MBS data.

Optionally, the normal MBS bearer or the separated MBS bearer may be used to select the broadcast sending mode. The network device may send the reception configuration information of the MBS to the terminal device by means of system information and MBS control channel information. The system information may be a System Information Block (SIB), and the MBS control channel information may be an MCCH.

The terminal device can receive the sending configuration information of the MBS in an idle or inactive state for the purpose of receiving the MBS data.

It is noted that the adjustment parameter may carry a candidate boundary value of the receiving window, a COUNT value of a next PDCP SDU to be received, and a HFN value. When the network device sends the adjustment parameter to the terminal device via a broadcast message or an MBS control channel message, the message carries the adjustment parameter and other configurations, such as initial access information in the SIB1.

For a change of the HFN value in the adjustment parameter, the terminal device may actively read the system information to obtain the changed HFN value, and the network device does not send the indication information for the change of the HFN value.

Further, in the scenario where the HFN value is changed, when other configuration information is also changed, for example, the initial access information in the SIB1 is changed, it can be understood that the current variable of the receiving window of the PDCP entity needs to be adjusted.

The network device may generate the indication information based on a candidate adjustment parameter configured for the terminal device and send it to the terminal device, to instruct the terminal device to adjust the variable of the receiving window based on the indication information. The indication information sent by the network device in this scenario carries the changed HFN value.

The change indication information can be a paging short message corresponding to a SIB message or an MCCH change notification corresponding to an MCCH message.

The method for configuring a receiving window of a PDCP entity of the disclosure is executed by a network device. The network device configures the adjustment parameter for the variable of the receiving window of the PDCP entity, generates the indication information based on the configured adjustment parameter and sends it to the terminal device, to provide the candidate configuration value for adjusting the variable of the receiving window, which realizes timely update of the variable of the receiving window of the PDCP entity, so that a new terminal device can join in at any time to receive MBS data, and the continuity and reliability of MBS data transmission can be ensured.

FIG. 13 is a flowchart of a method for configuring a receiving window of a PDCP entity provided by an embodiment of the disclosure. The method is executed by a network device. As illustrated in FIG. 13, the method includes the following steps.

At step S1301, an adjustment indication for indicating a terminal device to adjust a variable of the receiving window is sent to the terminal device.

In the embodiment of the disclosure, the terminal device may determine that the variable of the receiving window needs to be adjusted based on the adjustment indication sent by the network device. It may be understood that the adjustment indication sent by the network device may be used as a trigger event, to trigger the terminal device to adjust the variable of the receiving window.

Optionally, in response to determining that a new PDCP entity of an MRB needs to be established for the terminal device, the network device may send the adjustment indication to the terminal device. Optionally, in response to determining that a PDCP entity of the MRB needs to be re-established or reconfigured for the terminal device, the adjustment indication is sent to the terminal device.

At step S1302, an adjustment parameter corresponding to the variable of the receiving window of the PDCP entity is configured.

At step S1303, indication information is sent to the terminal device, in which the indication information is configured to indicate the terminal device to configure the variable of the receiving window of the PDCP entity based on the adjustment parameter, and the indication information carries the adjustment parameter.

Steps S1302 to S1303 can be referred to the above relevant detailed contents and will not be repeated herein.

According to the method for configuring a receiving window of a PDCP entity of the disclosure, the network device sends the adjustment indication information to the terminal device, so that the terminal device can accurately realize the adjustment of the variable of the receiving window of the PDCP entity, which ensures the continuity and reliability of MBS data transmission.

In the above embodiments of the disclosure, the methods provided in the embodiments of the disclosure are described from the perspectives of the network device and the terminal device, respectively. In order to realize each of the functions in the methods provided by the above embodiments of the disclosure, the network device and the terminal device may include a hardware structure, a software module, and realize each of the above functions in the form of the hardware structure, the software module, or a combination of the hardware structure and the software module. A certain function of the above functions may be performed in the form of a hardware structure, a software module, or a combination of the hardware structure and the software module.

Figure 14:
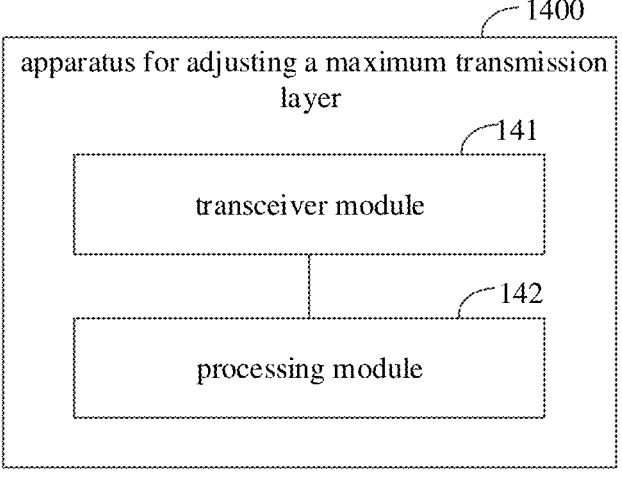
FIG. 14 is a block diagram of an apparatus for configuring a receiving window of a PDCP entity provided by an embodiment of the disclosure.

As illustrated in FIG. 14, FIG. 14 is a block diagram of an apparatus for configuring a receiving window of a PDCP entity provided by an embodiment of the disclosure. The apparatus 1400 for configuring a receiving window of a PDCP entity includes: a transceiver module 141 and a processing module 142.

The transceiver module 141 may include a sending module and/or a receiving module. The sending module is configured to realize a sending function, and the receiving module is configured to realize a receiving function. The transceiver module 141 may realize the sending function and/or the receiving function.

The apparatus for configuring a receiving window of a PDCP entity 1400 is a terminal device. The apparatus 1400 includes: the transceiver module 141 and the processing module 142.

The transceiver module 141 is configured to: determine an adjustment parameter corresponding to a variable of the receiving window of the PDCP entity.

The processing module 142 is configured to: configure the variable of the receiving window of the PDCP entity based on the adjustment parameter.

The transceiver module 141 is further configured to: receive indication information sent by a network device, in which the indication information carries the adjustment parameter.

The processing module 142 is further configured to: in response to the adjustment parameter including a window length and/or a boundary value of the receiving window, configure the variable of the receiving window according to the window length and/or the boundary value.

The processing module 142 is further configured to: in response to the boundary value being a candidate lower boundary value of the receiving window, configure a lower boundary value of the receiving window to be the candidate lower boundary value.

The processing module 142 is further configured to: in response to the boundary value being a target boundary value of the receiving window, determine a candidate lower boundary value of the receiving window according to the window length and the target upper boundary value, and configure a lower boundary value of the receiving window to be the candidate lower boundary value.

The processing module 142 is further configured to: in response to the adjustment parameter including a candidate sequence number of a next PDCP SDU to be received, configure a sequence number of the next PDCP SDU to be received of the receiving window to be the candidate sequence number.

The processing module 142 is further configured to: in response to the adjustment parameter including a HFN value, determine a SN value in a header of a first PDCP data packet received by the PDCP entity; and configure the variable of the receiving window according to the HFN value and the SN value.

The processing module 142 is further configured to: configure a HFN portion of the variable of the receiving window according to the HFN value, and configure a SN portion of the variable of the receiving window according to the SN value.

The processing module 142 is further configured to: configure a lower boundary value of the receiving window and/or a HFN portion of a sequence number of a next PDCP SDU y to be received to be the HFN value.

The processing module 142 is further configured to: determine a first sum of the SN value and a first target value, and configure the SN portion of the variable of the receiving window according to the first sum.

The processing module 142 is further configured to: in response to a target condition satisfied by the first sum, determine a candidate configuration value corresponding to the target condition, and configure a lower boundary value of the receiving window and/or a SN portion of a sequence number of a next PDCP SDU to be received to be the candidate configuration value.

The processing module 142 is further configured to: in response to a target condition that the first sum is greater than a maximum allowable value of the SN value being satisfied, determine 0 as the candidate configuration value; or, in response to a target condition that the first sum is less than 0 being satisfied, determine a second sum of the maximum allowable value of the SN value, the first sum and a second target value, and determine the second sum as the candidate configuration value; or, in response to a target condition that the first sum is greater than half of the maximum allowable value, determine the first sum as the candidate configuration value.

The transceiver module 141 is further configured to: determine a sequence number carried in a header of a first PDCP data packet received by the PDCP entity as the adjustment parameter.

The processing module 142 is further configured to: configure the variable of the receiving window according to the sequence number carried in the header.

The processing module 142 is further configured to: configure a lower boundary value of the receiving window and/or a sequence number of a next PDCP SDU to be received to be the sequence number carried in the header; or, determine a third sum of the sequence number carried in the header and a third target value, and configure the lower boundary value of the receiving window and/or the sequence number of the next PDCP SDU to be received to be the third sum.

The transceiver module 141 is further configured to: receive a broadcast message or an MBS control channel message, in which the broadcast message or the MBS control channel message is configured to carry the indication information.

The processing module 142 is further configured to: determine that a trigger event for adjusting the variable of the receiving window is satisfied. The trigger event includes at least one of the following events: receiving an adjustment indication sent by a network device, the adjustment indication being configured to indicate the terminal device to adjust the variable of the receiving window; or, establishing a new PDCP entity of an MRB; or, re-establishing or reconfiguring the PDCP entity of the MRB.

The apparatus 1400 for configuring a receiving window of a PDCP entity is a network device. The apparatus 1400 includes: the transceiver module 141 and the processing module 142.

The processing module 142 is configured to: configure an adjustment parameter corresponding to a variable of the receiving window of the PDCP entity.

The transceiver module 141 is configured to: send indication information to a terminal device, in which the indication information is configured to indicate the terminal device to configure the variable of the receiving window of the PDCP entity based on the adjustment parameter, and the indication information carries the adjustment parameter.

The processing module 142 is further configured to: configure the adjustment parameter to include a window length and/or boundary value of the receiving window.

The processing module 142 is further configured to: configure the adjustment parameter to include a candidate sequence number of a next PDCP SDU to be received.

The processing module 142 is further configured to: configure the adjustment parameter to include a HFN value.

The processing module 142 is further configured to: configure the adjustment parameter to include a sequence number carried in a header of a first PDCP data packet received by the PDCP entity.

The processing module 142 is further configured to: send a broadcast message or an MBS control channel message to the terminal device, in which the broadcast message or the MBS control channel message is configured to carry the indication information.

The transceiver module 141 is further configured to: send an adjustment indication for indicating the terminal device to adjust the variable of the receiving window to the terminal device.

With the apparatus for configuring a receiving window of a PDCP entity of the disclosure, the network device generates the adjustment indication based on the occurrence of the trigger event and sends it to the terminal device, and configures the adjustment parameter of the variable of the receiving window of the PDCP entity for the terminal device and sends it to the terminal device. After receiving the adjustment indication, the terminal device adjusts the variable of the receiving window based on the candidate configuration value carried in the acquired adjustment parameter. In the disclosure, timely update of the variable of the receiving window of the PDCP entity is realized, avoiding the limitation on newly added terminal devices due to the inability to update the variable of the receiving window of the PDCP entity, so that the new terminal devices can be added at any time to receive the MBS data, and the continuity and reliability of MBS data transmission can be ensured.

Figure 15:
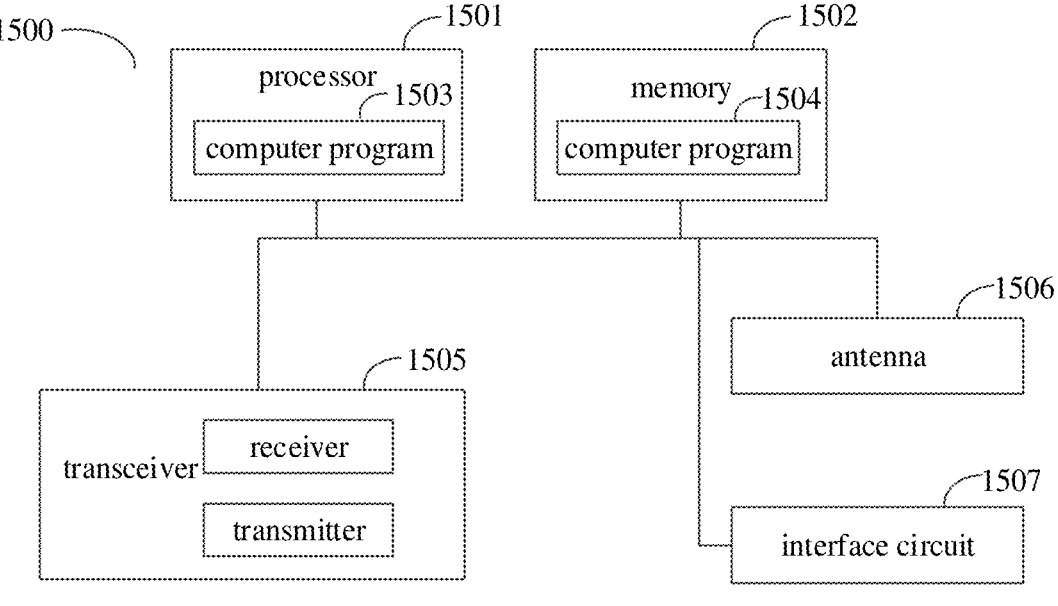
FIG. 15 is a schematic diagram of a communication device of an embodiment of the disclosure.

FIG. 15 is a schematic diagram of a communication device 1500 of an embodiment of the disclosure. The communication device 1500 may be a network device or a terminal device, or may be a chip, a chip system or a processor that supports the network device to realize the above-described methods, or may be a chip, a chip system or a processor that supports the terminal device to realize the above-described methods. The device may be used to realize the methods described in the above method embodiments with reference to the description of the above-described method embodiments.

The communication device 1500 may include one or more processors 1501. The processor 1501 may be a general purpose processor or a dedicated processor, such as, a baseband processor and a central processor. The baseband processor is used for processing communication protocols and communication data. The central processor is used for controlling the communication device (e.g., a base station, a baseband chip, a terminal device, a terminal device chip, a DU, or a CU), executing computer programs, and processing data of the computer programs.

Optionally, the communication device 1500 may include one or more memories 1502 on which computer programs 1504 may be stored. The processor 1501 executes the computer programs 1504 to cause the communication device 1500 to perform the methods described in the above method embodiments. Optionally, the memory 1502 may also store data. The communication device 1500 and the memory 1502 may be provided separately or may be integrated together.

Optionally, the communication device 1500 may also include a transceiver 1505 and an antenna 1506. The transceiver 1505 may be referred to as a transceiver unit, a transceiver machine, or a transceiver circuit, for realizing a transceiver function. The transceiver 1505 may include a receiver and a transmitter. The receiver may be referred to as a receiving machine or a receiving circuit, for realizing the receiving function. The transmitter may be referred to as a transmitter machine or a transmitting circuit, for realizing the transmitting function.

Optionally, the communication device 1500 may also include one or more interface circuits 1507. The interface circuits 1507 are used to receive code instructions and transmit them to the processor 1501. The processor 1501 runs the code instructions to cause the communication device 1500 to perform the method described in the method embodiments.

The communication device 1500 is a terminal device. The transceiver 1505 is used to perform step S201 in FIG. 2, step S401 in FIG. 4, and step S501 in FIG. 5. The processor 1501 is used to perform step S202 in FIG. 2, step S402 in FIG. 4, and step S502 in FIG. 5.

The communication device 1500 is a network device. The transceiver 1505 is used to perform step S1202 in FIG. 12 and step S1302 in FIG. 13. The processor 1501 is used to perform step S1201 in FIG. 12, and step S1301 and step S1303 in FIG. 13.

In an implementation, the processor 1501 may include a transceiver for implementing the receiving and sending functions. The transceiver may be, for example, a transceiver circuit, an interface, or an interface circuit. The transceiver circuit, the interface, or the interface circuit for implementing the receiving and sending functions may be separated or may be integrated together. The transceiver circuit, the interface, or the interface circuit described above may be used for reading and writing code/data, or may be used for signal transmission or delivery.

In an implementation, the processor 1501 may store a computer program 1503. When the computer program 1503 runs on the processor 1501, the communication device 1500 is caused to perform the methods described in the method embodiments above. The computer program 1503 may be solidified in the processor 1501, and in such case the processor 1501 may be implemented by hardware.

In an implementation, the communication device 1500 may include circuits. The circuits may implement the sending, receiving or communicating function in the preceding method embodiments. The processor and the transceiver described in this disclosure may be implemented on integrated circuits (ICs), analog ICs, radio frequency integrated circuits (RFICs), mixed signal ICs, application specific integrated circuits (ASICs), printed circuit boards (PCBs), and electronic devices. The processor and the transceiver can also be produced using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs) and so on.

Figure 16:
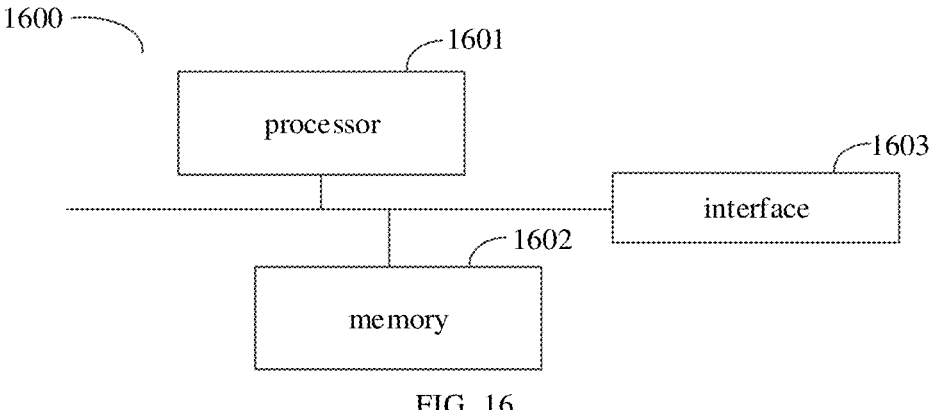
FIG. 16 is a schematic diagram of a chip of an embodiment of the disclosure.

The communication device in the description of the above embodiments may be a network device or a terminal device (e.g., the first terminal device in the preceding method embodiments), but the scope of the communication device described in the disclosure is not limited thereto, and the structure of the communication device may not be limited by FIG. 16. The communication device may be a stand-alone device or may be part of a larger device. For example the described communication device may be:

(1) a stand-alone IC, a chip, a chip system or a subsystem;

(2) a collection of ICs including one or more ICs, optionally, the collection of ICs may also include storage components for storing data and computer programs;

(3) an ASIC, such as a modem;

(4) a module that can be embedded within other devices;

(5) a receiver, a terminal device, a smart terminal device, a cellular phone, a wireless device, a handheld machine, a mobile unit, an in-vehicle device, a network device, a cloud device, an artificial intelligence device, and the like; and (6) others.

The case where the communication device may be a chip or a chip system is described with reference to the schematic structure of the chip shown in FIG. 16. The chip shown in FIG. 16 includes a processor 1601 and an interface 1602. There may be one or more processors 1601, and there may be multiple interfaces 1602.

In cases where the chip is used to implement the function of the terminal device in the embodiment of the disclosure:

the interface 1602 is used for performing step S201 in FIG. 2, step S401 in FIG. 4, and step S501 in FIG. 5.

In cases where the chip is used to implement the function of the network device in the embodiment of the disclosure:

the interface 1602 is used for performing step S1202 in FIG. 12 and step S1302 in FIG. 13.

Optionally, the chip further includes a memory 1603 used to store necessary computer programs and data.

It is understood by those skilled in the art that various illustrative logical blocks and steps listed in the embodiments of the disclosure may be implemented by electronic hardware, computer software, or a combination of both. Whether such function is implemented by hardware or software depends on the particular application and the design requirements of the entire system. Those skilled in the art may, for each particular application, use various methods to implement the described function, but such implementation should not be understood as beyond the scope of protection of the embodiments of the disclosure.

The embodiments of the disclosure also provide a system for configuring a receiving window of a PDCP entity. The system includes a communication device acting as a terminal device (e.g., the terminal device in the preceding method embodiments) and a communication device acting as a network device in the aforementioned embodiment of FIG. 15. Alternatively, it includes a communication device acting as a terminal device (e.g., the terminal device in the preceding method embodiments) and a communication device acting as a network device in the aforementioned embodiment of FIG. 16.

The disclosure also provides a readable storage medium having instructions stored thereon. When the instructions are executed by a computer, the function of any of the method embodiments described above is implemented.

The disclosure also provides a computer program product. When the computer program product is executed by a computer, the function of any of the method embodiments described above is implemented.

The disclosure also provides a chip system. The chip system includes at least one processor and an interface, for supporting the terminal device in realizing the functions involved in any of the method embodiments described above, or for supporting the network device in realizing the functions involved in any of the method embodiments described above, e.g., determining or processing at least one of data and information involved in the method described above. In an implementation, the chip system further includes a memory, which is configured to store necessary computer programs and data for the terminal device or the network device. The chip system may consist of chips or may include a chip and other discrete devices.

The disclosure also provides a computer program. When the computer program runs on a computer, the computer is caused to implement the method involved in any of the method embodiments described above.

The above embodiments may be implemented in whole or in part by software, hardware, firmware, or any combination thereof. When implemented using software, the above embodiments may be implemented, in whole or in part, in the form of a computer program product. The computer program product includes one or more computer programs. When loading and executing the computer program on the computer, all or part of processes or functions described in the embodiments of the disclosure is implemented. The computer may be a general-purpose computer, a dedicated computer, a computer network, or other programmable devices. The computer program may be stored in a computer-readable storage medium or transmitted from one computer-readable storage medium to another computer-readable storage medium. For example, the computer program may be transmitted from one web site, computer, server, or data center to another web site, computer, server, or data center, in a wired manner (e.g., using coaxial cables, fiber optics, or digital subscriber lines (DSLs) or wireless manner (e.g., using infrared wave, wireless wave, or microwave). The computer-readable storage medium may be any usable medium to which the computer is capable to access or a data storage device such as a server integrated by one or more usable mediums and a data center. The usable medium may be a magnetic medium (e.g., a floppy disk, a hard disk, and a tape), an optical medium (e.g., a high-density digital video disc (DVD)), or a semiconductor medium (e.g., a solid state disk (SSD)).

Those skilled in the art can understand that the first, second, and other various numerical numbers involved in the disclosure are only described for the convenience of differentiation, and are not used to limit the scope of the embodiments of the disclosure, or used to indicate the order of precedence.

The term "at least one" in the disclosure may also be described as one or more, and the term "multiple" may be two, three, four, or more, which is not limited in the disclosure. In the embodiments of the disclosure, for a type of technical features, "first", "second", and "third", and "A", "B", "C" and "D" are used to distinguish different technical features of the type, the technical features described using the "first", "second", and "third", and "A", "B", "C" and "D" do not indicate any order of precedence or magnitude.

The correspondences shown in the tables in this disclosure may be configured or may be predefined. The values of information in the tables are merely examples and may be configured to other values, which are not limited by the disclosure. In configuring the correspondence between the information and the parameter, it is not necessarily required that all the correspondences illustrated in the tables must be configured. For example, the correspondences illustrated in certain rows in the tables in this disclosure may not be configured. For another example, the above tables may be adjusted appropriately, such as splitting, combining, and the like. The names of the parameters shown in the titles of the above tables may be other names that can be understood by the communication device, and the values or representations of the parameters may be other values or representations that can be understood by the communication device. Each of the above tables may also be implemented with other data structures, such as, arrays, queues, containers, stacks, linear tables, pointers, chained lists, trees, graphs, structures, classes, heaps, and Hash tables.

The term "predefine" in this disclosure may be understood as define, define in advance, store, pre-store, pre-negotiate, pre-configure, solidify, or pre-fire.

Those skilled in the art may realize that the units and algorithmic steps of the various examples described in combination with the embodiments disclosed herein are capable of being implemented in the form of electronic hardware, or a combination of computer software and electronic hardware. Whether these functions are performed in the form of hardware or software depends on the specific application and design constraints of the technical solution. Those skilled in the art may use different methods to implement the described functions for each particular application, but such implementations should not be considered as beyond the scope of the disclosure.

It is clearly understood by those skilled in the field to which it belongs that, for the convenience and brevity of description, the specific working processes of the systems, apparatuses, and units described above can be referred to the corresponding processes in the preceding method embodiments, and will not be repeated herein.

The above are only specific implementations of the disclosure, but the scope of protection of the disclosure is not limited thereto. Those skilled in the art familiar to this technical field can easily think of changes or substitutions in the technical scope disclosed by the disclosure, which shall be covered by the scope of protection of the disclosure. Therefore, the scope of protection of the disclosure shall be governed by the scope of protection of the appended claims.

What is claimed is:

1. A method for configuring a receiving window of a packet data convergence protocol (PDCP) entity, executed by a terminal device, comprising:

determining an adjustment parameter corresponding to a variable of the receiving window of the PDCP entity; and configuring the variable of the receiving window of the PDCP entity based on the adjustment parameter;

wherein the adjustment parameter comprises at least one of a window length or a boundary value of the receiving window, the method further comprises:

configuring the variable of the receiving window according to the at least one of the window length or the boundary value.

2. The method of claim 1, wherein determining the adjustment parameter corresponding to the variable of the receiving window of the PDCP entity comprises:

receiving indication information sent by a network device, wherein the indication information carries the adjustment parameter.

3. The method of claim 2, wherein receiving the indication information sent by the network device comprises:

receiving a broadcast message or a multicast broadcast service (MBS) control channel message, wherein the broadcast message or the MBS control channel message is configured to carry the indication information.

4. The method of claim 1, further comprising one of:

determining that the boundary value is a candidate lower boundary value of the receiving window, and configuring a lower boundary value of the receiving window to be the candidate lower boundary value; or determining that the boundary value is a candidate upper boundary value of the receiving window, determining a candidate lower boundary value of the receiving window according to the window length and the candidate upper boundary value, and configuring a lower boundary value of the receiving window to be the candidate lower boundary value.

5. The method of claim 1, wherein the adjustment parameter comprises a candidate sequence number of a next PDCP service data unit (SDU) to be received, the method further comprising:

configuring a sequence number of the next PDCP SDU to be received of the receiving window to be the candidate sequence number.

6. The method of claim 1, wherein the adjustment parameter comprises a hyper frame number (HFN) value, the method further comprising:

determining a serial number (SN) value in a header of a first PDCP data packet received by the PDCP entity; and configuring the variable of the receiving window according to the HFN value and the SN value.

7. The method of claim 6, wherein configuring the variable of the receiving window according to the HFN value and the SN value comprises:

configuring a HFN portion of the variable of the receiving window according to the HFN value; and configuring a SN portion of the variable of the receiving window according to the SN value.

8. The method of claim 7, wherein configuring the HFN portion of the variable of the receiving window according to the HFN value comprises:

configuring at least one of a lower boundary value of the receiving window or a HFN portion of a sequence number of a next PDCP SDU to be received to be the HFN value; or wherein configuring the SN portion of the variable of the receiving window according to the SN value comprises:

determining a first sum of the SN value and a first target value; and configuring the SN portion of the variable of the receiving window according to the first sum.

9. The method of claim 8, wherein configuring the SN portion of the variable of the receiving window according to the first sum comprises:

determining that a target condition is satisfied by the first sum, and determining a candidate configuration value corresponding to the target condition; and configuring at least one of a lower boundary value of the receiving window or a SN portion of a sequence number of a next PDCP SDU to be received to be the candidate configuration value.

10. The method of claim 9, wherein determining that the target condition is satisfied by the first sum, and determining the candidate configuration value corresponding to the target condition, comprises one of:

determining a target condition that the first sum is greater than a maximum allowable value of the SN value being satisfied, and determining 0 as the candidate configuration value;

determining a target condition that the first sum is less than 0 being satisfied, and determining a second sum of the maximum allowable value of the SN value, the first sum and a second target value, and determining the second sum as the candidate configuration value; or determining a target condition that the first sum is greater than half of the maximum allowable value, and determining the first sum as the candidate configuration value.

11. The method of claim 1, further comprising:

determining a sequence number carried in a header of a first PDCP data packet received by the PDCP entity as the adjustment parameter; and configuring the variable of the receiving window according to the sequence number carried in the header.

12. The method of claim 11, wherein configuring the variable of the receiving window according to the sequence number carried in the header comprises one of:

configuring at least one of a lower boundary value of the receiving window or a sequence number of a next PDCP SDU to be received to be the sequence number carried in the header; or determining a third sum of the sequence number carried in the header and a third target value, and configuring at least one of the lower boundary value of the receiving window or the sequence number of the next PDCP SDU to be received to be the third sum.

13. The method of claim 1, further comprising:

determining that a trigger event for adjusting the variable of the receiving window is satisfied; wherein the trigger event comprises at least one of:

receiving an adjustment indication sent by a network device, the adjustment indication being configured to indicate the terminal device to adjust the variable of the receiving window;

establishing a new PDCP entity of an MBS radio bearer (MRB); or re-establishing or reconfiguring a PDCP entity of the MRB.

14. A method for configuring a receiving window of a packet data convergence protocol (PDCP) entity, executed by a network device, comprising:

configuring an adjustment parameter corresponding to a variable of the receiving window of the PDCP entity; and sending indication information to a terminal device, wherein the indication information is configured to indicate the terminal device to configure the variable of the receiving window of the PDCP entity based on the adjustment parameter, and the indication information carries the adjustment parameter;

wherein the adjustment parameter comprises at least one of:

a window length; or a boundary value of the receiving window.

15. The method of claim 14, wherein the adjustment parameter further comprises at least one of:

a candidate sequence number of a next PDCP service data unit (SDU) to be received;

a hyper frame number (HFN) value; or a sequence number carried in a header of a first PDCP data packet received by the PDCP entity.

16. The method of claim 14, wherein sending the indication information to the terminal device comprises:

sending a broadcast message or a multicast broadcast service (MBS) control channel message to the terminal device, wherein the broadcast message or the MBS control channel message is configured to carry the indication information.

17. The method of claim 14, wherein before sending the indication information to the terminal device, the method comprises:

sending an adjustment indication for indicating the terminal device to adjust the variable of the receiving window to the terminal device.

18. A network device, comprising:

a processor; and a memory storing computer programs, wherein the processor is configured to perform the method of claim 14.

19. A terminal device, comprising:

a processor; and a memory storing computer programs, wherein the processor is configured to:

determine an adjustment parameter corresponding to a variable of a receiving window of a packet data convergence protocol (PDCP) entity; and configure the variable of the receiving window of the PDCP entity based on the adjustment parameter;

wherein the adjustment parameter comprises at least one of a window length or a boundary value of the receiving window, the processor is further configured to:

configure the variable of the receiving window according to the at least one of the window length or the boundary value.

* * * * *